(12) United States Patent
Proctor

(10) Patent No.: US 10,550,985 B1
(45) Date of Patent: Feb. 4, 2020

(54) MESH APPARATUS FOR DIFFUSING RAINWATER DROPLETS IN A DOWNSPOUT

(71) Applicant: Paul Milton Proctor, San Jose, CA (US)

(72) Inventor: Paul Milton Proctor, San Jose, CA (US)

( * ) Notice: Subject to any disclaimer, the term of this patent is extended or adjusted under 35 U.S.C. 154(b) by 0 days.

(21) Appl. No.: 16/109,490

(22) Filed: Aug. 22, 2018

Related U.S. Application Data

(60) Provisional application No. 62/549,569, filed on Aug. 24, 2017.

(51) Int. Cl.
*E04D 13/08* (2006.01)
*F16L 55/07* (2006.01)
*F16L 55/027* (2006.01)

(52) U.S. Cl.
CPC ........ *F16L 55/02745* (2013.01); *E04D 13/08* (2013.01); *F16L 55/07* (2013.01); *E04D 2013/0806* (2013.01)

(58) Field of Classification Search
CPC ...... E04D 2013/086; E04D 2013/0866; E04D 13/0767; F16L 55/02709
USPC ............... 138/39, 41, 42; 52/12, 16, 144; 210/433.1, 130
See application file for complete search history.

(56) References Cited

U.S. PATENT DOCUMENTS

| | | | | |
|---|---|---|---|---|
| 1,653,473 A * | 12/1927 | Schulz | ............ | B01D 35/28 210/130 |
| 2,532,388 A * | 12/1950 | Batt, Jr. | ............ | E04D 13/08 210/447 |
| 4,470,908 A * | 9/1984 | Odekirk | ............ | B01D 35/00 210/463 |
| 4,798,028 A * | 1/1989 | Pinion | ............ | E03F 1/00 285/148.23 |
| 5,159,789 A * | 11/1992 | Haapanen | ............ | E04D 13/08 52/12 |
| 5,657,582 A * | 8/1997 | Chitwood | ............ | E04D 13/08 138/109 |
| 6,644,061 B1 * | 11/2003 | Woolfson | ............ | E04D 13/008 62/259.1 |
| 6,936,164 B2 * | 8/2005 | Wade | ............ | B01D 33/073 210/157 |
| 7,364,609 B2 * | 4/2008 | MacDuff | ............ | B01D 19/00 137/176 |
| 7,919,002 B1 * | 4/2011 | Hurtado | ............ | E04D 13/08 210/162 |
| 8,177,975 B2 * | 5/2012 | Schipper | ............ | B01D 19/0005 210/323.2 |
| 9,416,543 B1 * | 8/2016 | Fox | ............ | E04D 13/0767 |

(Continued)

*Primary Examiner* — Patrick F Brinson
(74) *Attorney, Agent, or Firm* — Plager Schack LLP; Mark H. Plager; Eric Liou

(57) ABSTRACT

A mesh apparatus for use in a downspout of a drainage system of a building to reduce noise of passing rainwater is provided. The mesh apparatus includes a mesh assembly having a mesh sheet with a rolled portion, the mesh sheet having a plurality of wires connected together to form a plurality of openings disposed throughout the sheet, and a fastener coupled to the mesh assembly to retain the rolled portion of the mesh sheet in a rolled configuration. The mesh assembly is inserted into the downspout. Rainwater passing through the downspout contacts any portion of the connected wires in the rolled portion of the sheet assembly, thereby diffusing the rainwater.

9 Claims, 2 Drawing Sheets

(56) References Cited

U.S. PATENT DOCUMENTS

| | | | |
|---|---|---|---|
| 2003/0051414 A1* | 3/2003 | Bessette | E04D 13/08 52/16 |
| 2007/0175106 A1* | 8/2007 | Rotter | E04D 13/0767 52/12 |
| 2011/0100887 A1* | 5/2011 | Ballistreri | E04D 13/08 210/170.03 |
| 2014/0054245 A1* | 2/2014 | Loesche | E04D 13/0767 210/791 |
| 2016/0040820 A1* | 2/2016 | Morris | F15D 1/04 138/39 |

* cited by examiner

MESH APPARATUS FOR DIFFUSING RAINWATER DROPLETS IN A DOWNSPOUT

RELATED APPLICATION

The application claims priority to provisional patent application U.S. Ser. No. 62/549,569 filed on Aug. 24, 2017, the entire contents of which is herein incorporated by reference.

BACKGROUND

The embodiments herein relate generally to downspouts connected to gutters installed on building roofs.

A building typically comprises a drainage system to direct water from precipitation such as rain or snow deposited on the roof away from the building. The drainage system generally comprises a gutter coupled to and extending along an edge of the roof and a downspout connected to the gutter and extending along the side of the building's façade. Water on the roof travels through the gutter and down the downspout by gravity. The collected rainwater exits the bottom end of the downspout and into the ground area surrounding the building. In some cases, a splash block is positioned beneath the bottom end of the downspout to disperse collected water farther away from the building.

Current downspouts create noise when water droplets fall down and contact an interior wall of the downspout. This noise can create a nuisance that negatively affects the peace and quality of life of the homeowner or other individuals present near the building. In addition, this generated noise can disrupt an individual's relaxation and his/her ability to achieve a restful night of sleep.

As such, there is a need in the industry for a mesh apparatus for use with a downspout that effectively reduces the amount of noise generated from rainwater passing therein.

SUMMARY

A mesh apparatus for use in a downspout of a drainage system of a building to reduce noise of rainwater passing therethrough is provided. The mesh apparatus is configured to insert through an outlet of the downspout to diffuse the passing rainwater. The mesh apparatus comprises a mesh assembly comprising a mesh sheet having a rolled portion, the mesh sheet comprising a plurality of wires connected together to form a plurality of openings disposed throughout the sheet, and a fastener coupled to the mesh assembly to retain the rolled portion of the mesh sheet in a rolled configuration, wherein the mesh assembly is inserted into the downspout with the fastener partially protruding out the outlet of the downspout, wherein rainwater passing through the downspout contacts any portion of the connected wires in the rolled portion of the sheet assembly, thereby diffusing the rainwater through the plurality of openings in the rolled portion of the mesh sheet proximate the any portion of the connected wires.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
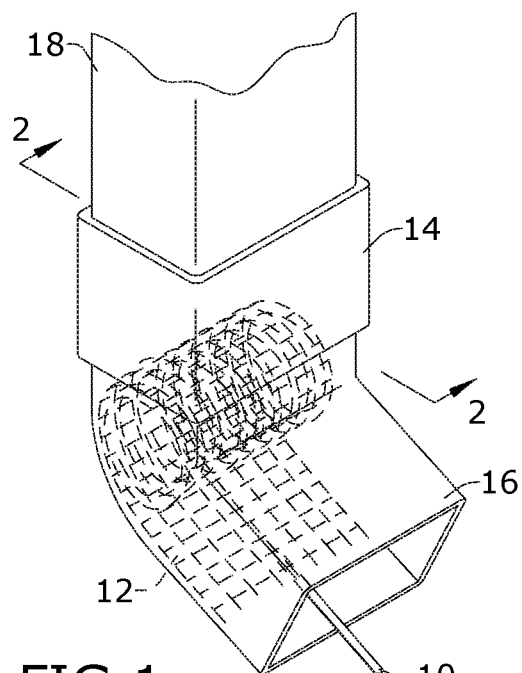
FIG. 1 depicts a perspective view of certain embodiments of the mesh apparatus shown in use.
Figure 2:
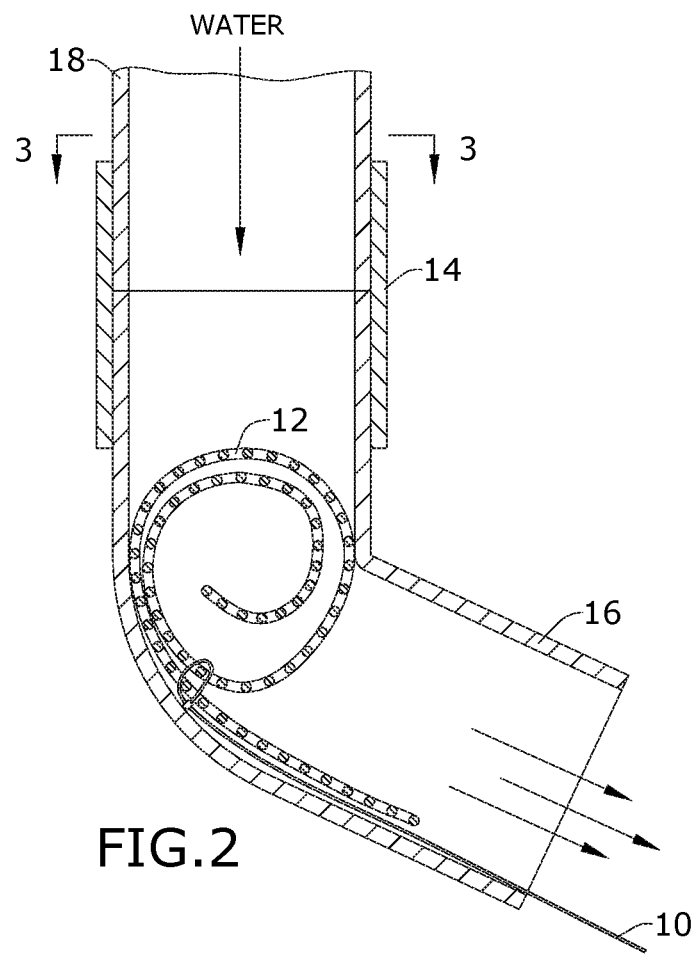
FIG. 2 depicts a section view of certain embodiments of the mesh apparatus, taken along line 2-2 in FIG. 1.
Figure 3:
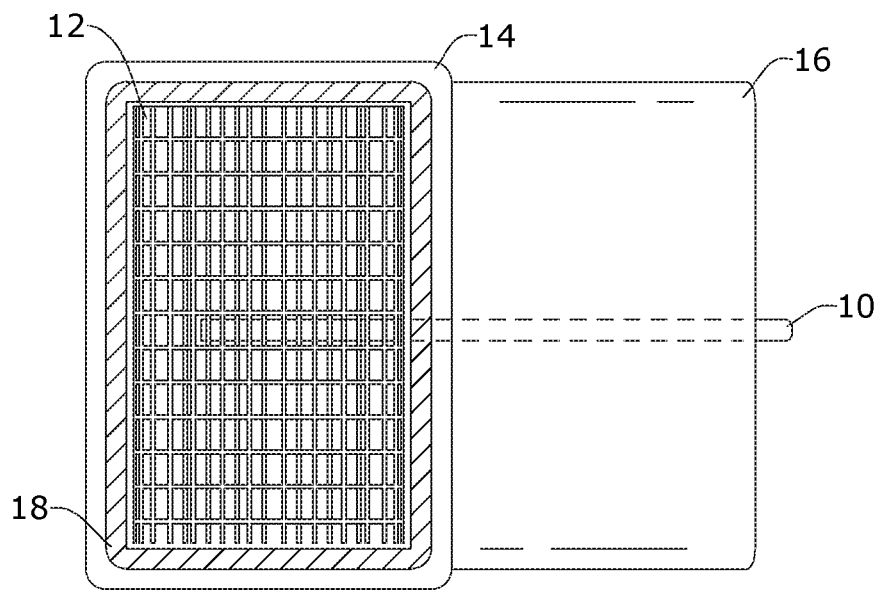
FIG. 3 depicts a section view of certain embodiments of the mesh apparatus, taken along line 3-3 in FIG. 2.

As depicted in FIGS. 1-3, the mesh apparatus is configured for use with a downspout of a building to reduce the noise of water from rain, snow or other precipitation passing through. More specifically, the mesh apparatus reduces the noise of passing water by diffusing water droplets falling within the downspout into smaller droplets. This reduces the size of any water droplets that contact the inner side wall of the downspout, thereby minimizing the noise of the passing water.

The downspout of the building may be any type known in the field that is coupled to the drainage system of the building and extending along the facade of the building. In one embodiment, the downspout comprises vertical downspout member 18 coupled to downspout elbow 16 by coupling 14. Water from rain, snow or other precipitation flows on the roof of the building and through the gutter, vertical downspout member 18, coupling 14 and downspout elbow 16. The water in the downspout exits an outlet of downspout elbow 16 and away from the building. It shall be appreciated that the dimensions of the components of vertical downspout member 18, downspout elbow 16 and coupling 14 may vary. In one embodiment, certain portions of the downspout comprise approximate dimensions of 2¾" wide and 1¾" deep.

In certain embodiments of the invention, the mesh apparatus comprises mesh sheet 12 and fastener 10. In a preferred embodiment, mesh sheet 12 is made from any material including, but not limited to, wires made from metal, polypropylene or other thermoplastic polymers. In one embodiment, the wires of mesh sheet 12 are coated with vinyl or another material to enhance durability and prevent the formation of rust or corrosion on the mesh apparatus. Mesh sheet 12 is formed by a plurality of wires connected together to form a plurality of openings throughout the entire sheet. The plurality of wires of mesh sheet 12 can be interwoven together in one embodiment.

In one embodiment, mesh sheet 12 forms a generally rectangular sheet comprising approximate dimensions of 12" in length and 3" in width. However, the dimensions of mesh sheet 12 may vary to accommodate downspouts having different sizes. In one embodiment, each opening in mesh sheet 12 comprises a square-shaped opening with approximate dimensions within the range of ¼"-½"×¼"-½". In one embodiment, the area of each opening in mesh sheet 12 is approximately 0.0625-0.25 squared inches. In one embodiment, the plurality of wires in mesh sheet 12 form a plurality of identical-sized openings throughout the sheet. In an alternative embodiment, the plurality of wires in mesh sheet 12 form a plurality of different-sized openings throughout the sheet.

As depicted in FIG. 2, mesh sheet 12 is preferably rolled to form a rolled portion and an unrolled portion. The rolled portion of mesh sheet 12 comprises a generally cylindrical member with an outer cross-sectional diameter within the approximate range of 1½"-4½". In one embodiment, the rolled portion of mesh sheet 12 comprises an outer cross-sectional diameter of approximately 1¾". In one embodiment, the rolled portion of mesh sheet 12 comprises an outer cross-sectional diameter of approximately 2". It shall be appreciated that the size of the rolled portion of mesh sheet 12 can vary depending on the size of the interior space within the downspout. The size of the rolled portion of mesh sheet 12 preferably is sufficiently large to extend across the entire interior cross-section of downspout elbow 16 as depicted in FIG. 2.

Fastener 10 is coupled to mesh sheet 12 to retain the rolled portion of mesh sheet 12 in a rolled configuration. In one embodiment, fastener 10 is preferably a zip-tie fastener comprising a strap approximately 8" in length with a first end and second end with a slide fastener. The first end of the strap is configured to insert through the slide fastener of the second end to create a loop portion in the strap. In one embodiment, fastener 10 is maneuvered so the first end of the strap is inserted through a plurality of openings in the rolled portion of mesh sheet 12 and the slide fastener of the second end of the strap. The second end of the strap of fastener 10 is pulled to extend beyond mesh sheet 12 as depicted in FIGS. 1-3. This tightens the loop portion of the strap of fastener 10 securely in place on mesh sheet 12 to retain the rolled portion in the rolled configuration. In an alternative embodiment, fastener 10 may comprise other fasteners including, but not limited to, wires, clips, straps, and the like.

In operation, the downspout of a building is inspected to ensure the interior walls are free of debris. In one embodiment, a strainer can be inserted at the top of the downspout inside of the gutter to prevent debris from falling into the downspout. Mesh sheet 12 is rolled into the desired diameter to fit the corresponding downspout. Specifically, mesh sheet 12 has to be sized and rolled accordingly to permit the mesh apparatus to insert through the outlet of downspout elbow 16 as depicted in FIGS. 1-2. Fastener 10 is disposed through any of the plurality of openings in the rolled portion of mesh sheet 10 and secured in place via the slide fastener to retain the rolled portion of mesh sheet 12 in the rolled configuration as previously described.

The mesh apparatus is inserted through the outlet of downspout elbow 16 such that the entire mesh sheet 12 is positioned entirely within the downspout. In this position, the rolled portion of mesh sheet 12 is positioned directly below vertical downspout 18. In a preferred embodiment, the strap of fastener 10 extends out the outlet of downspout elbow 16.

Figure 4:
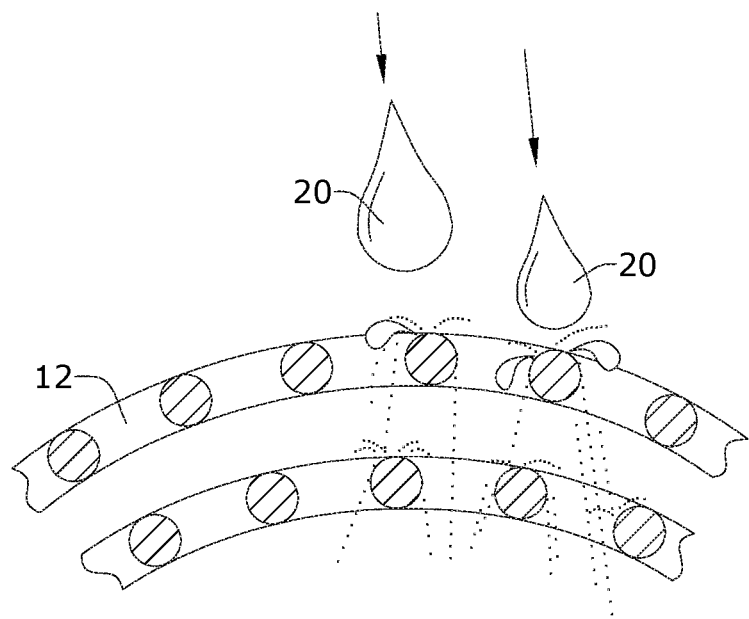
FIG. 4 depicts a section view of certain embodiments of the mesh apparatus.

As depicted in FIGS. 2 and 4, droplets 20 of water from rain or other precipitation travel in the gutter and flow to vertical downspout 18. Droplets 20 of water pass through vertical downspout 18 and contact a portion of the connected wires in the rolled portion of the mesh apparatus. Contact between droplets 20 and any portion of the connected wires in mesh sheet 12 diffuses droplets 20 into smaller droplets and/or mist that pass through the surrounding openings in the rolled portion of mesh sheet 12. This diffusion of droplets 20 of water eliminates the noise generated from water droplets contacting an interior wall of the downspout. At any time, an individual can easily remove the mesh apparatus from the downspout by pulling on the exposed end of fastener 10 protruding outside the outlet of downspout elbow 16.

It shall be appreciated that the components of the mesh apparatus described in several embodiments herein may comprise any alternative known materials in the field and be of any color, size and/or dimensions. It shall be appreciated that the components of the mesh apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A mesh apparatus for use in a downspout of a drainage system of a building to reduce noise of rainwater passing therethrough, the mesh apparatus configured to insert through an outlet of the downspout to diffuse the passing rainwater, the mesh apparatus comprising:
    a mesh assembly comprising a mesh sheet having a rolled portion, the mesh sheet comprising a plurality of wires connected together to form a plurality of openings disposed throughout the sheet; and
    a fastener coupled to the mesh assembly to retain the rolled portion of the mesh sheet in a rolled configuration;
    wherein the mesh assembly is inserted into the downspout with the fastener partially protruding out the outlet of the downspout, wherein rainwater passing through the downspout contacts any portion of the connected wires in the rolled portion of the sheet assembly, thereby diffusing the rainwater through the plurality of openings in the rolled portion of the mesh sheet proximate the any portion of the connected wires.

2. The mesh apparatus of claim 1, wherein the fastener comprises a zip tie fastener comprising a first end and a second end comprising a slide fastener.

3. The mesh apparatus of claim 2, wherein the first end of the zip tie fastener is maneuvered through the slide fastener in the second end to create a loop portion in the zip tie fastener, the loop portion in the zip tie fastener extending through a portion of the plurality of openings in the rolled portion of the mesh sheet.

4. The mesh apparatus of claim 3, wherein the mesh sheet comprises an unrolled portion.

5. The mesh apparatus of claim 4, wherein the rolled portion of the mesh sheet forms a generally cylindrical assembly with a diameter within an approximate range of 1½-4½ inches.

6. The mesh apparatus of claim 5, wherein each opening in the plurality of openings in the mesh sheet comprises an area of approximately 0.0625-0.25 squared inches.

7. The mesh apparatus of claim 6, wherein the mesh sheet is made from a material selected from the group consisting of metal, polypropylene and thermoplastic polymer.

8. A method for reducing noise of rainwater passing through a downspout of a drainage system of a building, the method comprising:
    providing a mesh apparatus, the mesh apparatus comprising:
        a mesh assembly comprising a mesh sheet having a rolled portion, the mesh sheet comprising a plurality of wires connected together to form a plurality of openings disposed throughout the sheet; and
        a fastener coupled to the mesh assembly to retain the rolled portion of the mesh sheet in a rolled configuration;
    inserting the mesh assembly in the downspout to permit rainwater passing through the downspout to contact any portion of the connected wires in the rolled portion of the sheet assembly, thereby diffusing the rainwater through the plurality of openings in the rolled portion of the mesh sheet proximate the any portion of the connected wires; and maneuvering the mesh apparatus so that the fastener partially protrudes out an outlet of the downspout.

9. The method of claim 8, wherein the fastener of the mesh apparatus comprises a zip tie fastener comprising a first end and a second end comprising a slide fastener.

\* \* \* \* \*